United States Patent

[11] 3,579,137

[72] Inventor Robert H. Walden
Scotch Plains, N.J.
[21] Appl. No. 772,335
[22] Filed Oct. 31, 1968
[45] Patented May 18, 1971
[73] Assignee Bell Telephone Laboratories, Incorporated
Murray Hill, Berkeley Heights, N.J.

[54] THIN FILM THERMAL DEVICE
5 Claims, 2 Drawing Figs.

[52] U.S. Cl. .......... 330/38, 330/61
[51] Int. Cl. .......... H03f 15/00
[50] Field of Search .......... 330/38 (M), 38 (FE); 317/234/8.128, 235/8.1, 235/21.1

[56] References Cited

UNITED STATES PATENTS

| | | | |
|---|---|---|---|
| 3,259,759 | 7/1966 | Glaever .......... | 307/88.5 |
| 3,300,644 | 1/1967 | Zemel et al. .......... | 250/211 |
| 3,405,331 | 10/1968 | Skalski et al. .......... | 317/235 |
| 3,477,033 | 11/1969 | Goetzberger et al. .......... | 330/30 |

*Primary Examiner*—Nathan Kaufman
*Attorneys*—R. J. Guenther and Arthur J. Torsiglieri

ABSTRACT: A thin film thermal device comprises an MIS structure fabricated on a low thermal conductivity insulator. A first DC bias and AC signal input are applied across the metal layer and a second DC bias is applied across, and the AC signal output taken from, the semiconductor layer. The device operates as an audio amplifier if the first DC bias current is greater than the second and operates as a frequency doubler if the first DC bias current is zero.

INVENTOR
R. H. WALDEN
BY
ATTORNEY

THIN FILM THERMAL DEVICE

BACKGROUND OF THE INVENTION

This invention relates to thin film thermal devices and more particularly to thin film thermal amplifiers and frequency doublers which operate at audio frequencies.

In telephone communications systems it is frequently necessary to amplify or frequency translate audio signals, i.e., voice frequencies. Conventionally, devices which perform these functions comprise various well-known transistor circuits which for obvious reasons would be fabricated in integrated circuit form, but for the lack of a solid-state inductor necessary to the design of the upper cutoff frequency of such a device. Complicated analog circuits have been devised by those skilled in the prior art to perform the function of a solid-state inductor, but such schemes are generally undesirable since their complexity disadvantageously adds to both the cost and size of the overall device.

SUMMARY OF THE INVENTION

The present invention is a thin film thermally operated device which can perform either audio amplification or frequency translation without the need of a solid-state inductor or any circuit analog thereof. Because it is a thin film device which can be easily fabricated from readily available materials and by well-known techniques, its size and cost are advantageously reduced.

The invention in one illustrative embodiment comprises a metal-insulator-semiconductor (MIS) sandwich structure fabricated upon a low thermal conductivity insulator. Separate DC bias sources are connected across the metallic layer (input bias) and the semiconductive layer (output bias). An AC signal input is also applied to the metallic layer and the output is taken from the semiconductive layer. The device operates as an audio amplifier if the input bias current exceeds the output bias current and operates as a frequency doubler if the input bias current is zero.

BRIEF DESCRIPTION OF THE DRAWINGS

The invention, together with its various features and advantages, can be easily understood from the following more detailed description taken in conjunction with the accompanying drawings, in which.

DETAILED DESCRIPTION

Structure

Figure 1:
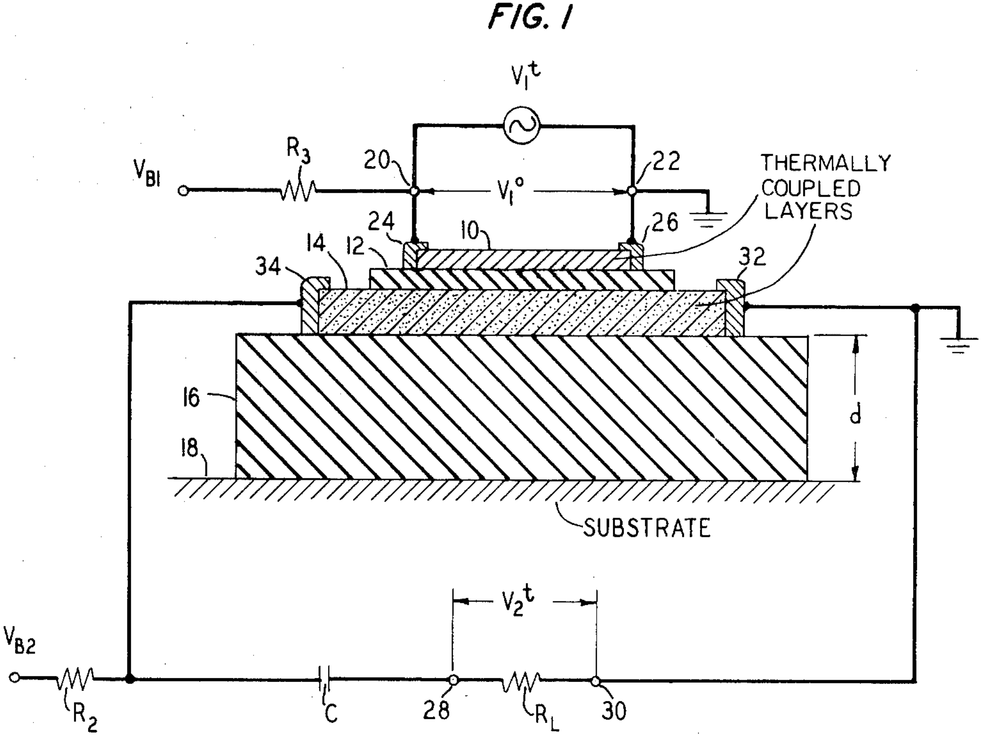
FIG. 1 is a schematic of an illustrative embodiment of the invention.

Turning now to FIG. 1 there is shown in accordance with an illustrative embodiment of the invention a thin film thermal device comprising an MIS sandwich structure i.e., an insulative layer 12 deposited between a metallic layer 10 and a semiconductive layer 14. The MIS structure is fabricated upon a low thermal conductivity insulator 16 (of thickness $d$) which is supported by a high thermal conductivity substrate 18.

The following materials and dimensions are illustrative only and are not to be construed as limitations upon the scope of the invention. Typically, the metallic layer 10 comprises chromium 500 A. thick, the insulative layer 12 comprises silicon monoxide 1 micron thick, the semiconductive layer 14 comprises silicon 1000—2000 A. thick, the insulator 16 comprises silicon dioxide $2\mu$ thick (i.e., $d=2\mu$) of thermal conductivity $K=1.4\times A10^{12}$ watts/cm.$^2$–K°and the substrate comprises heavily doped silicon.

The structure as set forth above is coupled to external circuitry as follows. Across input terminals 20 and 22, which are connected via contacts 24 and 26 to metallic layer 10, is connected an input signal source $V_1^t$. Terminal 22 is grounded and terminal 20 is connected through resistor $R_3$ to an input bias source $V_{B1}$. Across output terminals 28 and 30 is connected a load represented by resistor $R_L$ across which is developed a voltage $V_2^t$. Terminal 30 is connected through contact 32 to one side of semiconductive layer 14 and is grounded, whereas terminal 28 is connected through a blocking capacitor C to the other side of layer 14 via contact 34. In addition, an output bias source $V_{B2}$ is connected through resistor $R_2$ to the ungrounded side of semiconductive layer 14 via contact 34.

Operation

In operation, the insulative layer 12 serves to electrically insulate metallic layer 10 from semiconductive layer 14 and, in addition, thermally couples electrical changes from the input to the output. Specifically, the metallic layer 10 is assumed to have a temperature independent resistance $R_1$ and the semiconductive layer 14 is assumed to have a temperature dependent resistance R(T) given by $$R(T)=R_\infty e^{E/kT} \qquad (1)$$

where $R_\infty$ is the resistance at $T=\infty$; E is the activation energy of the semiconductor (0.6 ev. for silicon) and $k$ is Boltzmann's constant. The time varying signal $V_1^t$ applied to the input causes temperature variations in the semiconductor via indirect heating coupled through insulator 12 with the result that R(T) changes so as to produce a time varying signal $V_1^t$ at the output. The device operates as an amplifier provided that the input bias current exceeds the output bias current or operates as a frequency doubler provided that the input bias current is removed.

The upper cutoff frequency of the device is determined by the thermal time constant of the thin film structure. Because the semiconductive layer 14 and insulative layer 12 are thin compared to insulator 16, and because the insulative layer 12 has a much higher thermal conductivity than insulator 16, to a good approximation only the insulator 16 is important in determining the thermal behavior of the device. Under these conditions the time constant $\tau$ is given approximately by $$\tau=\frac{2d^2}{\alpha} \qquad (2)$$

where $\alpha$ is the thermal diffusivity of insulator 16. For example, for a silicon dioxide insulator 16, $\alpha\approx 8\times 10^{13}$cm.$^2$/sec. and $d=2P10^{14}$ cm., the time constant $\tau\approx 10^{15}$ sec., which would limit the device to operation at audio frequencies. Of course, use of a device with a smaller thickness insulator 16 or one with higher thermal diffusivity would reduce the time constant and hence increase the upper cutoff frequency of the device.

Equivalent Circuit

Figure 2:
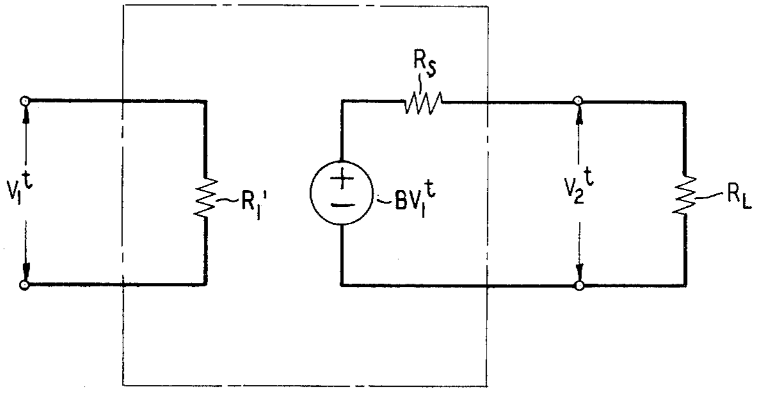
FIG. 2 is an approximate small signal equivalent circuit of the embodiment shown in FIG. 1.

The small signal equivalent circuit of the thin film thermal amplifier of FIG. 1 is shown in FIG. 2. It includes an input circuit comprising a voltage source $V_1^t$ connected across an input resistance $R_1'$, where $$R_1'=\frac{R_1R_3}{R_1+R_3} \qquad (3)$$

and an output circuit comprising the series combination of resistance $R_s$ and input dependent voltage source $\beta V_1^t$, where $\beta$ is the gain factor and $R_s$ is given by $$R_s=\left\{\frac{\bar{D}[1-\lambda P_2^0(1-D)]}{D[1-\lambda P_2^0(1-\bar{D})]}-1\right\} \qquad (4)$$

$$D=\frac{2R_2}{(R_0+R_2)\left(1+\frac{R_0R_2}{R_0+R_2}\cdot\frac{1}{R_L}\right)} \qquad (5)$$

$$\bar{D}=\frac{2R_2}{R_0+R_2} \qquad (6)$$

$$\lambda=\frac{E}{kT_0}\,\frac{d}{Kl^2T_0} \qquad (7)$$

where $R_0$ is the time independent portion of R(T), $T_0$ is the operating temperature of the semiconductor. K is the thermal conductivity of insulator 16, $l$ is the lateral dimension of insulator 16 (typically $2\times10'3$ cm.) assuming it to be square, and $P_2^0$ is time independent power dissipated in the semiconductor 14.

The output equivalent circuit becomes an ideal voltage source under the constraint that $$\lambda P_2^0 = 1 \qquad (8)$$

provided that D, $\bar{D} \neq 0$. Under these conditions the equivalent circuit parameters of FIG. 1 become $$\beta = -\frac{I_1^0}{I_2^0}$$

and $$R_s = 0 \qquad (9)$$

where $I_1^0$ and $I_2^0$ are the DC bias currents of the input and output, respectively. The voltage, current and power gains respectively then are given by $$A_V = \beta \qquad (10)$$

$$A_I = \beta \frac{R_1'}{R_L} \qquad (11)$$

and $$A_P = \beta^2 \frac{R_1'}{R_L} \qquad (12)$$

If it is desired to cascade stages, then the input impedance is made to match the load impedance (i.e., $R_1' = R_2$). Under these circumstances the gains are given by $$A_V = A_I = \beta \qquad (13)$$

$$A_P = \beta^2 . \qquad (14)$$

That is, the gain depends simply on the ratio of the input bias current to the output bias current.

Example

For the purposes of illustration, assume the following resistor values:

$$R_1 = R_3 = R_0 R_2 = 2R_L = 2R \qquad (15)$$

then D, $\bar{D}$ become $\bar{D}=1$ and D=½ and the gain is $$\beta = -\frac{V_{B1}}{V_{B2}} \qquad (16)$$

Under the constraint of equation (8) and assuming $\beta=2$, it can be shown that the power gain is given by $$A_P = \frac{\Delta T_1^0}{\Delta T_2^0} \qquad (17)$$

where the temperature swing in the metallic layer $\Delta T_1^0$ is given by $$\Delta T_1^0 = \frac{dP_1^0}{Kl^2} \qquad (18)$$

and similarly the temperature swing in the semiconductor is given by $$\Delta T_2^0 = \frac{dP_2^0}{Kl^2} \qquad (19)$$

which yields the following requirements $$\frac{\Delta T_1^0}{\Delta T_2^0} = 4 \qquad (20)$$

and $$\frac{\Delta T_2^0}{T_0} \frac{E}{kT_0} = 1 \qquad (21)$$

Assuming that the substrate temperature is 300° K. (room temperature) and $\Delta T_2^0$30° C., then $\Delta T_1^0$=120° C., and $T_0$=450 k∼175° C., and consequently it is required that E=0.6 ev., which is approximately the activation energy of silicon.

Typical power levels include $P_2^0$=×10¹³ watts and $P_1^0$= 3.4×10² watts for parameters $\Delta T_2^0$=30° C., K=1.4×A10¹² watts/cm. K°. ($SiO_2$), $l$=2×10¹³ cm., and $d$=2×10¹⁴ cm. In order to reduce second harmonic distortion (i.e., ≤1 percent) the output signal power $P_2'$ should be less than about 0.1×10¹³ watts.

While the above example uses an ambient temperature of 300° K., it is feasible to operate the device at lower temperatures. If, for example, the substrate temperature is reduced to 77° K. (liquid nitrogen) then equations (20) and (21) are satisfied with E=0.15 ev., $\Delta T_2^0$=7.5° C. and $\Delta T_1^0$ =30° C., a considerable reduction in temperature swing. In addition, the thermal conductivity of insulator 16 will increase by a factor of about four, provided that the insulator is a single crystal. Consequently, the power requirement would be about the same as for the device operated at room temperature. If the insulator were amorphous, the thermal conductivity would decrease as would the power requirements.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

I claim:

1. A thin film thermal circuit comprising
   a substrate, a low thermal conductivity insulative first layer mounted on said substrate, a semiconductive second layer formed on said first layer, a high thermal conductivity insulative third layer formed on said semiconductive layer, a metallic fourth layer formed on said third layer,
   input DC bias means and an AC signal source connected across said metallic first layer, and
   output DC bias means connected across said semiconductive second layer, said third layer being effective to thermally couple electrical changes in said metallic fourth layer to said semiconductive second layer, the output of said circuit being taken across said second layer.

2. The circuit of claim 1 wherein the thermal conductivity of said third layer is greater than that of said first layer, and the thickness of said first layer is greater than that of either said second or third layers.

3. The circuit of claim 2 for use as a frequency doubler wherein the magnitude of the input DC bias current is zero.

4. The circuit of claim 2 for use as an amplifier wherein the magnitude of the input DC bias current exceeds that of the output DC bias current.

5. The circuit of claim 4 wherein said insulative first layer comprises silicon dioxide, said semiconductive second layer comprises silicon, and said insulative third layer comprises silicon monoxide.

UNITED STATES PATENT OFFICE
CERTIFICATE OF CORRECTION

Patent No. 3,579,137 Dated May 18, 1971

Inventor(s) Robert H. Walden

It is certified that error appears in the above-identified patent and that said Letters Patent are hereby corrected as shown below:

Column 1, line 69, change "$K = 1.4 \times A10^{12}$" to--$K = 1.4 \times 10^{-2}$--.

Column 2, line 26, change "$V_1^t$" to --$V_2^t$--.

Column 2, line 43, change "$\alpha \approx 8 \times 10^{13}$ cm$^2$/sec" to --$\alpha \approx 8 \times 10^{-3}$ cm$^2$/sec--.

Column 2, line 44, change "$P10^{14}$ cm" to --$X\ 10^{-4}$ cm--.

Column 3, line 42, Equation 15, change "$R_1 = R_3 = R_o R_2 \equiv 2R_1 \equiv 2R$" to --$R_1 = R_3 = R_o = R_2 = 2R_L \equiv 2R$--.

Column 4, line 10, change "$P_2^0 = X\ 10^{13}$" to --$P_2^0 = 8.4 \times 10^{-3}$--.

Column 4, line 11, change "$K = 1.4 \times A10^{12}$" to --$K = 1.4 \times 10^{-2}$--.

Column 4, line 12, change "$l = 2 \times 10^{13}$ cm., and $d = 2 \times 10^{14}$ cm" to --$l = 2 \times 10^{-3}$ cm., and $d = 2 \times 10^{-4}$ cm.--.

Column 4, line 14, change "$0.1 \times 10^{13}$" to --$0.1 \times 10^{-3}$--.

Signed and sealed this 9th day of November 1971.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
☆ U.S. GOVERNMENT PRINTING OFFICE : 1969 O - 366-334